US008912275B2

(12) United States Patent
Yosifon et al.

(10) Patent No.: US 8,912,275 B2
(45) Date of Patent: Dec. 16, 2014

(54) CONTINUOUS SOLUTION OF POLYMER IN LIQUID

(75) Inventors: Shai Yosifon, Kiryat Tivon (IL); Iris Glazer, Kiryat Shmona (IL); Yoav Dayan, Kibbutz Ein HaShofet (IL); Daphna Halevy, Tel Aviv (IL); Amnon Shoshani, Givat Ada (IL)

(73) Assignee: T.I.P. Ltd., Caesarea (IL)

( * ) Notice: Subject to any disclaimer, the term of this patent is extended or adjusted under 35 U.S.C. 154(b) by 1 day.

(21) Appl. No.: 13/641,176

(22) PCT Filed: Apr. 13, 2011

(86) PCT No.: PCT/US2011/032198
§ 371 (c)(1), (2), (4) Date: Oct. 15, 2012

(87) PCT Pub. No.: WO2011/130336
PCT Pub. Date: Oct. 20, 2011

(65) Prior Publication Data

US 2013/0041095 A1 Feb. 14, 2013

Related U.S. Application Data

(60) Provisional application No. 61/323,390, filed on Apr. 13, 2010.

(51) Int. Cl.

| | |
|---|---|
| ***B01F 1/00*** | (2006.01) |
| ***B01F 15/02*** | (2006.01) |
| ***C08J 3/02*** | (2006.01) |
| ***C08L 29/04*** | (2006.01) |
| ***C08L 33/06*** | (2006.01) |

(52) U.S. Cl.
CPC ............. *B01F 1/0011* (2013.01); *B01F 1/0016* (2013.01); *B01F 2001/0083* (2013.01); *B01F 2001/0094* (2013.01)
USPC ........... 524/563; 524/556; 524/557; 366/241; 366/190

(58) Field of Classification Search
CPC ............ C08J 3/02; C08L 29/04; C08L 33/06; B01F 1/00; B01F 15/02
USPC ................... 524/563, 556, 557; 366/190, 241
See application file for complete search history.

(56) References Cited

U.S. PATENT DOCUMENTS

| | | | | |
|---|---|---|---|---|
| 3,160,397 | A * | 12/1964 | Kelecom | 366/149 |
| 3,945,920 | A * | 3/1976 | Paszyc et al. | 210/801 |
| 5,512,265 | A | 4/1996 | Funahashi et al. | |
| 5,626,422 | A * | 5/1997 | Adamo et al. | 366/173.1 |
| 2004/0022698 | A1 * | 2/2004 | Uhrie et al. | 422/161 |

FOREIGN PATENT DOCUMENTS

| | | |
|---|---|---|
| DE | 278120 | 9/1914 |
| JP | 6296980 | 10/1994 |
| JP | 7149518 | 6/1995 |

OTHER PUBLICATIONS

Selvol tm Polyvinyl Alcohol product brochure—http://www.sekisui-sc.com/productliterature/pdf/selvol/SelvolPVOH_Brochure_EN.pdf*

* cited by examiner

*Primary Examiner* — Ling Choi
*Assistant Examiner* — Ronald Grinsted
(74) *Attorney, Agent, or Firm* — Dekel Patenet Ltd.; David Klein

(57) ABSTRACT

Apparatus for continuously preparing a homogeneous solution (28) of powder in liquid including a mixing chamber (16) into which a liquid solvent (14) is introduced via an inlet pipe, and into which a solid solute (12) is fed via a dosing unit, an agitator (26) operative to mix the solid solute with the liquid solvent so that the solid solute dissolves in the liquid solvent to form a homogeneous solution, and a fluid dynamic separator (34) placed within a flow of the solute (12) and the solvent (14) in the chamber (16), the fluid dynamic separator (34) operative to create a region (38) isolated from the rest of the flow in the chamber and to cause solid particles of the solute that have not yet dissolved in the solvent to flow away from the region so that the region contains the homogeneous solution of the solute dissolved in the solvent.

5 Claims, 1 Drawing Sheet

CONTINUOUS SOLUTION OF POLYMER IN LIQUID

CROSS-REFERENCE TO RELATED APPLICATIONS

This application is a national phase patent application of, and claims priority from, PCT Patent Application PCT/US11/32198, filed Apr. 13, 2011, and claims priority under 35 USC §119 to U.S. Provisional Patent Application 61/323,390, filed Apr. 13, 2010.

FIELD OF THE INVENTION

The present invention relates generally to a method and apparatus for continuously preparing a homogeneous solution of powder in liquid, such as an aqueous solution of hard-to-wet polymer.

BACKGROUND OF THE INVENTION

For industrial purposes, it is frequently necessary to rapidly combine streams of liquids and solids to form solutions on a continuous basis. The problems encountered in forming uniform solutions by mixing powdered or granulated solids with liquids have been researched extensively. However, dissolving hard-to-wet and/or hard to dissolve materials, such as certain polymers, is not an easy task, as is now explained.

Many water soluble polymers, such as polyvinyl alcohol (PVA), cellulose derivatives, such as hydroxyethyl cellulose, carboxymethyl cellulose and the like, are soluble in water but are nevertheless very difficult to dissolve. The polymer particles adhere strongly to one another on wetting and tend to form lumps. In most traditional mixing devices, such lumps become wetted before the particles disperse into individual particles. The wetted surface of a lump becomes an impermeable film that hinders break up of the lump, and the lumps are carried through the mixer with the powder inside remaining substantially dry and unmixed with the liquid.

In the prior art, preparing solutions of hard-to-wet and/or hard to dissolve polymer powders is done as a batch process. For example, ambient temperature water is fed into a blend tank, and the water is agitated to form a vortex. The powder is then dispersed in the ambient water by gradually adding it to the vortex. The agitated mixture of powder and water is heated using, to a specific cure temperature. The mixture is held and agitated at the cure temperature for the time required to dissolve the powder. PVA, for example, is first formed into a slurry in ambient temperature water and then usually heated to a temperature of at least 90° C. Under these conditions, the complete dissolution of the slurry typically takes 30 to 60 minutes and yields no greater than a 10% solution. Hydroxyethyl cellulose is another hard-to-wet powder which, although curing at ambient temperature, usually requires at least two hours to form a complete solution.

There are many disadvantages with the prior art method. It is inefficient, costly, capital intensive and time-consuming. The powder is added to water at ambient temperature with high agitation to disperse the powder. If the water is at an elevated temperature, the powder clumps more readily. Once the powder is relatively well dispersed, the mixture must be heated and held at the higher temperature in order to dissolve the polymer. The mixing, heating, and curing cycle is slow. In addition, the space required for the blend tank may present a problem in installing a polymer solution system in an existing plant. Also problematic is that undissolved powder clumps can remain in the solution and result in inconsistent solution properties. Solution aeration due to the high speed agitation required for polymer dispersion and excessive foaming due to the heat-curing requirement are additional problems. The fact that the prior art must work with batches is another disadvantage; it is logistically difficult and costly to work with large amounts/containers of raw material and large, intermediate storage inventories.

Other methods have been proposed to tackle these problems. For example, processes have been described that use two mixing vessels. In the first mixing vessel, a high-molecular weight polymer is combined with a solvent and agitated to form a slurry. More intensive mixing and agitating occurs in the second vessel to convert the slurry into a solution. Another process attempts to use a jet liquid spray to break up lumps of the polymer powder.

SUMMARY OF THE INVENTION

The present invention seeks to provide an improved method and apparatus for continuously preparing a homogeneous solution of powder in liquid, such as an aqueous solution of hard-to-wet and/or hard to dissolve polymer, as is described in detail further hereinbelow. The invention is particularly effective for polyvinyl alcohol, but is also applicable to other polymers, such as but not limited to, polyvinyl acetate.

There is thus provided in accordance with an embodiment of the present invention apparatus for continuously preparing a homogeneous solution of powder in liquid including a mixing chamber into which a liquid solvent is introduced via an inlet pipe, and into which a solid solute is fed via a dosing unit, an agitator operative to mix the solid solute with the liquid solvent so that the solid solute dissolves in the liquid solvent to form a homogeneous solution, and a fluid dynamic separator placed within a flow of the solute and the solvent in the chamber, the fluid dynamic separator operative to create a region isolated from the rest of the flow in the chamber and to cause solid particles of the solute that have not yet dissolved in the solvent to flow away from the region so that the region contains a homogeneous solution of the solute dissolved in the solvent. A pump may be used to draw the homogeneous solution out of the region.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
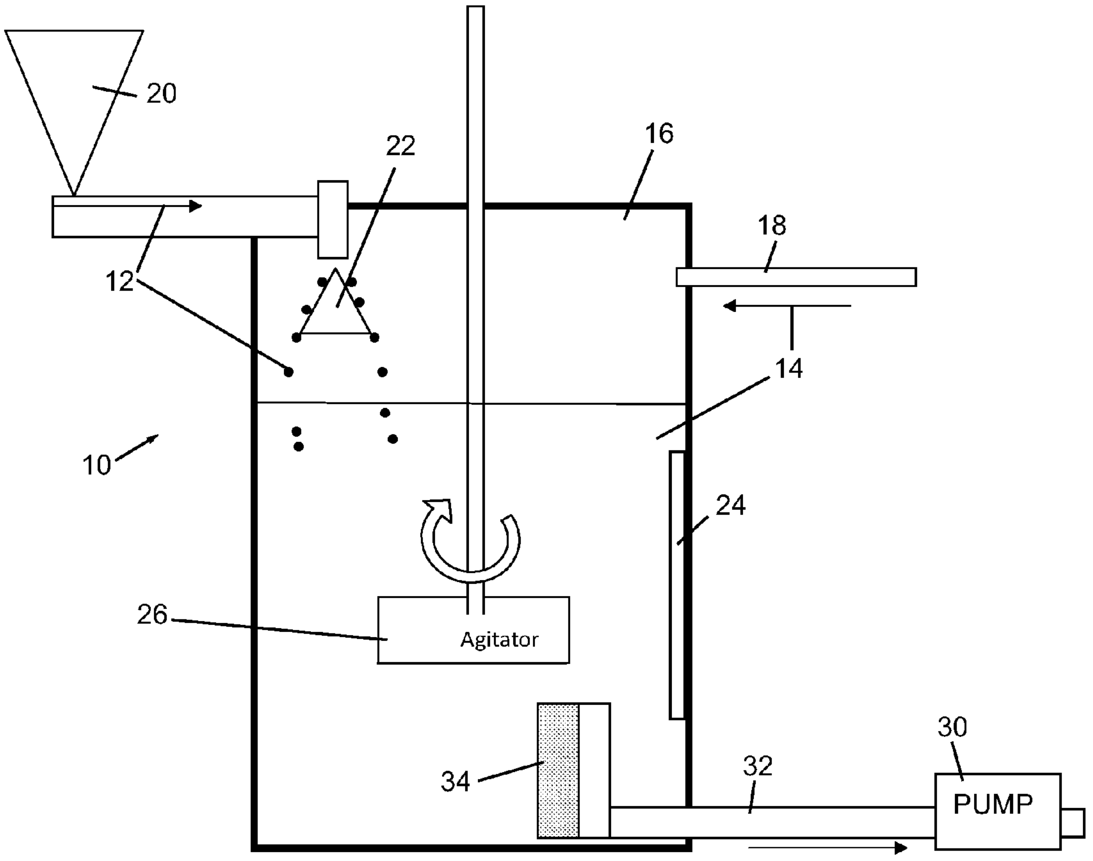
FIG. 1 is a simplified side-view illustration of apparatus for continuously preparing a homogeneous solution of powder in liquid, constructed and operative in accordance with an embodiment of the present invention.
Figure 2:
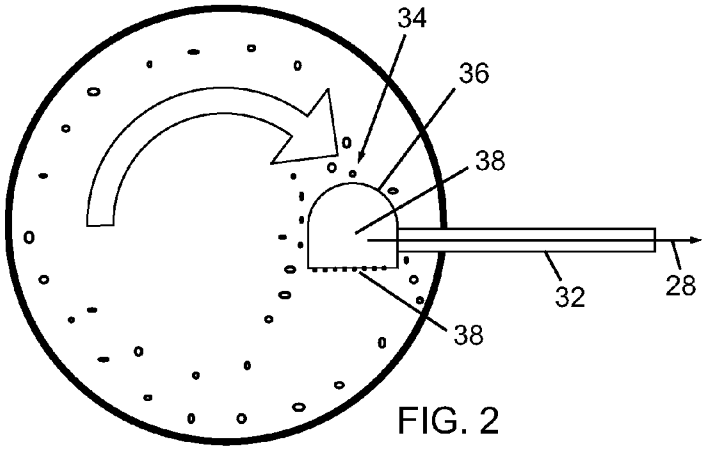
FIG. 2 is a simplified top-view illustration of a fluid dynamic separator in the apparatus of FIG. 1, in accordance with an embodiment of the present invention.

Reference is now made to FIGS. 1 and 2, which illustrate apparatus 10 for continuously preparing a homogeneous solution of powder 12 (also referred to as solute 12) in a liquid solvent 14 (also referred to as liquid 14), constructed and operative in accordance with an embodiment of the present invention. Powder 12 may include, without limitation, a hard-to-wet and/or hard to dissolve polymer, such as but not limited to, polyvinyl alcohol or polyvinyl acetate. Liquid 14 is preferably water, but may be other solvents or combination of solvents as well, depending on the solute (powder 12). "Powder" refers to any solid solute that comprises small particles, each particle being of a size that is soluble in the solvent (liquid 14). The solute may include heterogeneous materials, such as polyvinyl alcohol with hydroxyethyl cellulose, for example.

Apparatus 10 includes a mixing chamber 16 into which liquid solvent 14 is introduced via an inlet pipe 18 or gravity. Chamber 16 can be of any shape or size (not necessarily round) and its shape may be engineered to help with fluid dynamic separation mentioned below. The solid solute 12 is fed via an inlet hopper 20, and flows over a particle separator 22, such as (but not limited) a cone, that helps the grains of the dry powder to be separately inserted into the solvent 14. Inlet hopper 20 and particle separator 22 form a dosing unit to introduce the powder into the liquid. The solid solute 12 may be introduced in other manners, such as but not limited to, pressurized feed into the solvent or other methods that help the grains of the dry powder to be separately inserted into the solvent 14.

Liquid solvent 14 may be introduced at an elevated temperature and/or may be heated in chamber 16 with a heater 24 (e.g., an internal or external heating jacket or other heating element). An agitator 26 (also called mixer 26), such as but not limited to, a blade mixer, ultrasonic stirrer or a device that agitates by means of pumped fluid, and others, is used to mix and otherwise agitate powder 12 with liquid 14 to form a homogeneous solution 28 of powder 12 and liquid 14. More than one agitator or types of agitators may be used.

Agitator 26 creates a flow of solute 12 and solvent 14. The flow may be laminar or turbulent or anything in between, or any combination thereof, with or without swirling. In accordance with an embodiment of the present invention, a fluid dynamic separator 34 is placed within the flow of solute 12 and solvent 14 and includes a barrier 36 that defines a region 38 isolated from the rest of the flow in chamber 16. Fluid dynamic separator 34 may also create the separation without a solid barrier, but with a fluid barrier, e.g., created by a jet or vortex or turbulence or other flow type. The fluid dynamic separator 34 causes solid particles of solute 12 that have not yet dissolved in solvent 14 to flow away from region 38. Thus, region 38 contains a homogeneous solution 28 of solute 12 dissolved in solvent 14. A pump 30 draws homogeneous solution 28 out of region 38 via an exit pipe 32. The homogeneous solution 28 may also be extracted by gravity or other means. A filter may be placed at the pump inlet or outlet, if desired.

A preferred fluid dynamic separator is a Coanda effect separator. The Coanda effect, described in U.S. Pat. No. 2,052,869, is basically the tendency of a moving fluid, either liquid or gas, to attach itself to a surface and flow along it. As the fluid moves across the surface a certain amount of friction (skin friction) occurs between the fluid and the surface, which tends to slow the moving fluid. This resistance to the flow of the fluid pulls the fluid towards the surface, causing it stick to the surface. For example, fluid dynamic separator 28 may have a bell shape, wherein fluid impinging upon the head of the bell flows along the outer skirt of the bell and flows outwards off the lip of the bell. This causes the solid, undissolved particles to flow towards the walls of chamber 16 away from region 38, so that region 38 only has fully dissolved solution. Another example of a fluid dynamic separator is an impeller that creates centrifugal force on the undissolved particles to cause them flow towards the walls of chamber 16 away from region 38. In any case, region 38 of the mixing chamber is substantially free from particles, and the dissolved solution can be extracted by pump 30.

The solute 12 and solvent 14 are fed at a given rate and the solution exits at the same rate. Accordingly, a steady state, constant percentage of solute dissolved in the solvent is extracted from chamber 16.

The liquid may be heated under pressure (e.g., water may be heated under pressure to above 100° C.). This accelerates the dissolving process.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for continuously preparing a homogeneous solution of powder in liquid comprising:

introducing a liquid solvent and a solid solute into a mixing chamber;

mixing said solid solute with said liquid solvent so that said solid solute dissolves in said liquid solvent to form a homogeneous solution; and placing a fluid dynamic separator comprising a Coanda effect separator within a flow of said solute and said solvent in said chamber, said fluid dynamic separator creating a region isolated from the rest of the flow in said chamber and causing solid particles of said solute that have not yet dissolved in said solvent to flow away from said region so that said region contains the homogeneous solution of said solute dissolved in said solvent, wherein said fluid dynamic separator comprises a bell having a head, a lip and an outer skirt, and the method comprises said solute and said solvent impinging upon the head of the bell, flowing along the outer skirt of the bell and flowing outwards off the lip of the bell, thereby causing the solid, undissolved particles to flow towards walls of said chamber away from said region.

2. The method according to claim 1, further comprising drawing the homogeneous solution out of said region.

3. The method according to claim 1, wherein said solid solute comprises polyvinyl alcohol.

4. The method according to claim 1, wherein said solid solute comprises polyvinyl acetate.

5. The method according to claim 1, wherein said Coanda effect separator comprises a friction surface over which said solute and said solvent flow, and the method comprises said solute and said solvent moving across the friction surface, wherein friction occurs between said solute and said solvent and the friction surface, which slows said solute and said solvent and causes said solute and said solvent to stick to the friction surface.

* * * * *